US009514350B2

(12) United States Patent
Wang et al.

(10) Patent No.: US 9,514,350 B2
(45) Date of Patent: Dec. 6, 2016

(54) FINGERPRINT RECOGNITION ELEMENT, A DISPLAY SCREEN AND A DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Haisheng Wang, Beijing (CN); Xue Dong, Beijing (CN); Hongjuan Liu, Beijing (CN); Xiaoliang Ding, Beijing (CN); Shengji Yang, Beijing (CN); Yingming Liu, Beijing (CN); Weijie Zhao, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/415,560

(22) PCT Filed: Jun. 11, 2014

(86) PCT No.: PCT/CN2014/079670
§ 371 (c)(1),
(2) Date: Jan. 16, 2015

(87) PCT Pub. No.: WO2015/051644
PCT Pub. Date: Apr. 16, 2015

(65) Prior Publication Data
US 2016/0042215 A1 Feb. 11, 2016

(30) Foreign Application Priority Data

Oct. 11, 2013 (CN) .......................... 2013 1 0472849

(51) Int. Cl.
*G06K 9/00* (2006.01)
(52) U.S. Cl.
CPC ......... *G06K 9/0002* (2013.01); *G06K 9/00087* (2013.01)

(58) Field of Classification Search
CPC ........... G06K 9/0002; G06K 9/00087; G06K 9/0012
USPC .................................... 382/124, 125; 283/68
See application file for complete search history.

(56) References Cited

U.S. PATENT DOCUMENTS 5,940,525 A * 8/1999 Itsumi .................. G06K 9/0002
283/68
6,647,133 B1 * 11/2003 Morita ............... G06K 9/00013
340/562
(Continued)

FOREIGN PATENT DOCUMENTS

CN      101887200 A     11/2010
CN      102566840 A      7/2012
(Continued)

OTHER PUBLICATIONS

International Search Report and Written Opinion with English Language Translation, dated Sep. 19, 2014, Application No. PCT/CN2014/079670.
(Continued)

*Primary Examiner* — Daniel Mariam
(74) *Attorney, Agent, or Firm* — Blakely Sokoloff Taylor & Zafman LLP

(57) ABSTRACT

The present invention discloses a fingerprint recognition element comprising: a plurality of parallel fingerprint detecting electrodes, the distance between two adjacent fingerprint detecting electrodes being not larger than the distance between adjacent ridge and valley in the fingerprint, a fingerprint recognition signal being loaded to one end of each fingerprint detecting electrode, and the fingerprint recognition signal being acquired in real time at the other end of each fingerprint detecting electrode. The present invention further discloses a display screen comprising the fingerprint recognition element and a display device comprising the display screen.

21 Claims, 5 Drawing Sheets

(56) References Cited

U.S. PATENT DOCUMENTS

| | | | |
|---|---|---|---|
| 8,564,314 B2* | 10/2013 | Shaikh | G06K 9/0002 |
| | | | 324/658 |
| 8,724,038 B2* | 5/2014 | Ganapathi | G02B 26/0833 |
| | | | 345/173 |
| 2013/0002607 A1* | 1/2013 | Bayramoglu | G06F 3/044 |
| | | | 345/174 |
| 2013/0135247 A1 | 5/2013 | Na et al. | |

FOREIGN PATENT DOCUMENTS

| | | |
|---|---|---|
| CN | 102859476 A | 1/2013 |
| CN | 103530609 A | 1/2014 |
| CN | 203535653 U | 4/2014 |
| EP | 0919947 | 6/1999 |
| JP | 11-118415 A | 4/1999 |
| JP | H1199141 | 4/1999 |

OTHER PUBLICATIONS

Office Action in Chinese Application No. 201310472849.4 dated Jul. 25, 2016, with English translation. 12 pages.

Chinese Office Action with English Language Translation, dated Mar. 18, 2016, Chinese Application No. 201310472849.4.

Third Chinese Office Action with English Language Translation, dated Sep. 23, 2016, Chinese Application No. 2013104728494.

* cited by examiner

FINGERPRINT RECOGNITION ELEMENT, A DISPLAY SCREEN AND A DISPLAY DEVICE

FIELD OF THE INVENTION

The present invention relates to the field of display technology, particularly to a fingerprint recognition element, a display screen and a display device.

BACKGROUND OF THE INVENTION

The fingerprint is an inherent, unique and distinguishable invariable characteristic of the human body. It consists of a series of ridges and valleys on the surface of the skin at the finger tip. The composition of these ridges and valleys generally includes details such as ridge bifurcation, ridge end, arch, tent arch, left rotation, right rotation, spiralism or double rotation etc., which determines uniqueness of the fingerprint pattern. The fingerprint recognition technology developed therefrom is an earlier technology that is used as personal identity verification, due to the differences in fingerprint acquisition and input, the widely used and well known technologies at present include: optical imaging, heat-sensitive sensor, human body infrared sensor and so on.

SUMMARY OF THE INVENTION

In view of this, the embodiments of the present invention provide a fingerprint recognition element, a display screen and a display device for implementing the fingerprint recognition function using a simple capacitance structure.

According to an aspect of the present invention, a fingerprint recognition element is provided, comprising a plurality of fingerprint detecting electrodes parallel to one another, a fingerprint recognition signal being loaded to one end of each of the fingerprint detecting electrodes, and the fingerprint recognition signal being acquired in real time at the other end of each of the fingerprint detecting electrodes;

wherein the distance between two adjacent fingerprint detecting electrodes is not greater than the distance between adjacent ridge and valley in a fingerprint.

The fingerprint recognition element provided by the embodiment of the present invention makes use of the principle of self-capacitance to load a fingerprint recognition signal to one end of each of the fingerprint detecting electrodes parallel to one another, and acquire in real time the finger recognition signal at the other end of each fingerprint detecting electrode. When a user finger approaches the fingerprint recognition element, since there are uneven ridges and valleys on the surface of the skin of the finger, the distances between respective points on the skin surface and the respective fingerprint detecting electrodes are also different, thereby influencing the capacitance value of the respective fingerprint detecting electrodes. By detecting the differences of the signals acquired from respective fingerprint detecting electrodes at each moment in the process of touching the fingerprint recognition element by the finger, a two-dimensional pattern of the fingerprint consisting of ridges and valleys that corresponds to the finger can be detected, so as to realize fingerprint recognition.

Further, in order to detect differences of signals acquired from respective fingerprint detecting electrodes, the fingerprint recognition element provided by the embodiment of the present inveniton further comprises: connecting terminal pads in one-to-one correspondence with the fingerprint detecting electrodes, the fingerprint detecting electrodes being in electrical connection with the coresponding connecting terminal pads through leads.

Alternatively, in order to detect differences of signals acquired from respective fingerprint detecting electrodes, the fingerprint recognition element provided by the embodiment of the present inveniton further comprises: a data selector and a connecting terminal pad, the respective fingerprint detecting electrodes connecting with the data selector through leads, the data selector electrically connecting the respective fingerprint detecting electrodes with the connecting terminal pad time-divisionally.

According to another aspect of the present inveniton, a display screen is provided, comprising an upper substrate and a lower substrate arranged in opposition, further comprising at least one fingerprint recognition element according to the present invention arranged on the lower substrate and/or the upper substrate.

Specifically, in the above display screen provided by the embodiment of the present invention, the display screen comprises a peripheral area and a display area with a plurality of pixel regions arranged in an array;

the fingerprint recognition element is located in the display area consisting of the pixel regions;

the respective fingerprint detecting electrodes in the fingerprint recognition element are located at gaps between adjacent pixel regions.

Specifically, the above display screen provided by the embodiment of the present invention further comprises: touch sensing electrodes arranged in the same layer and extending in the same direction as the fingerprint detecting electrodes, and touch driving electrodes arranged to intersect with the touch sensing electrodes.

Specifically, in the above display screen provided by the embodiment of the present invention, the touch sensing electrodes and the fingerprint detecting electrodes are located at a side of the upper substrate facing the lower substrate; the touch driving electrodes are located at a side of the lower substrate facing the upper substrate.

Specifically, in the above display screen provided by the embodiment of the present invention, each one of the touch driving electrodes consists of a plurality of touch driving sub-electrodes extending along a direction perpendicular to the extending direction of the fingerprint detecting electrodes, the plurality of touch driving sub-electrodes are connected with one another in series thorugh leads located in the peripheral area.

Specifically, in the above display screen provided by the embodiment of the present invention, a common electrode is arranged between two adjacent touch driving sub-electrodes that constitute one of the touch driving electrodes;

the orthographic projections of the respective touch sensing electrodes on the lower substrate are located in an area where the common electrode locates.

Specifically, in the above display screen provided by the embodiment of the present invention, the orthographic projections of respective fingerprint detecting electrodes on the lower substrate are located in an area where the common electrode locates.

Specifically, the above display screen provided by the embodiment of the present invention further comprises: a connecting terminal pad that correpsonds to the fingerprint detecting electrodes, a switching device that corresponds to the connecting terminal pad, a touch control chip and a fingerprint detecting chip;

within the touch time period of one frame, the switching device conducts the connecting terminal pad with the touch control chip;

within the fingerprint recognition time period of one frame, the switching device conducts the connecting terminal pad with the fingerprint detecting chip.

According to a further aspect of the present invention, a display device is provided, comprising the above display screen according to the present invention.

DETAILED DESCRIPTION OF THE INVENTION

Figure 1A:
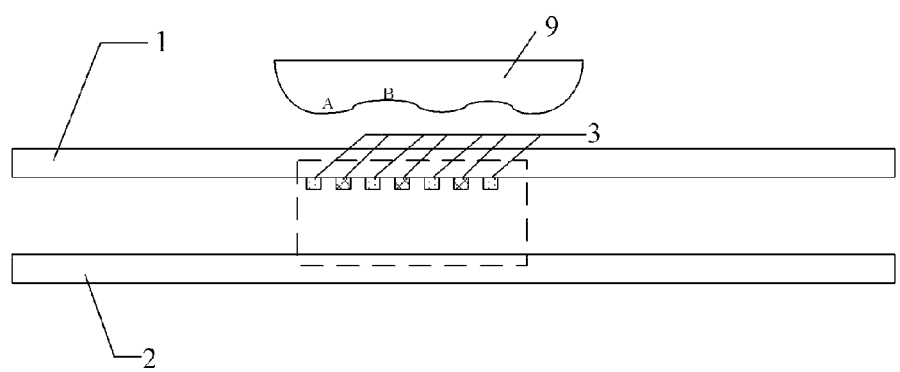
FIG. 1a. to FIG. 1b are sectional schematic views of a fingerprint recognition element in a display screen provided by an embodiment of the present invention.

Next, the fingerprint recognition element, the display screen and the display device provided by the embodiments of the present invention will be described in detail with reference to the drawings.

The shape and thickness of respective film layers in the drawings do not reflect the real proportion of the upper substrate or the lower substrate in the display screen, which are only for schematically explaining the contents of the present invention.

The embodiment of the present invention provides a fingerprint recognition element comprising a plurality of fingerprint detecting electrodes parallel to one another, a fingerprint recognition signal being loaded to one end of each of the fingerprint detecting electrodes, and the fingerprint recognition signal being acquired in real time at the other end of each of the fingerprint detecting electrodes;

wherein the distance between two adjacent fingerprint detecting electrodes is not greater than the distance between adjacent ridge and valley in a fingerprint.

The fingerprint recognition element provided by the embodiment of the present invention makes use of the principle of self-capacitance to load a fingerprint recognition signal to one end of each of the fingerprint detecting electrodes parallel to one another, and acquire in real time the finger recognition signal at the other end of each fingerprint detecting electrode. When a user finger approaches the fingerprint recognition element, since there are uneven ridges and valleys on the surface of the skin of the finger, the distances between respective points on the skin surface and the respective fingerprint detecting electrodes are also different, thereby influencing the capacitance value of the respective fingerprint detecting electrodes. By detecting the differences of the signals acquired from respective fingerprint detecting electrodes at each moment in the process of touching the fingerprint recognition element by the finger, a two-dimensional pattern of the fingerprint consisting of ridges and valleys that corresponds to the finger can be detected, so as to realize fingerprint recognition.

Figure 1B:
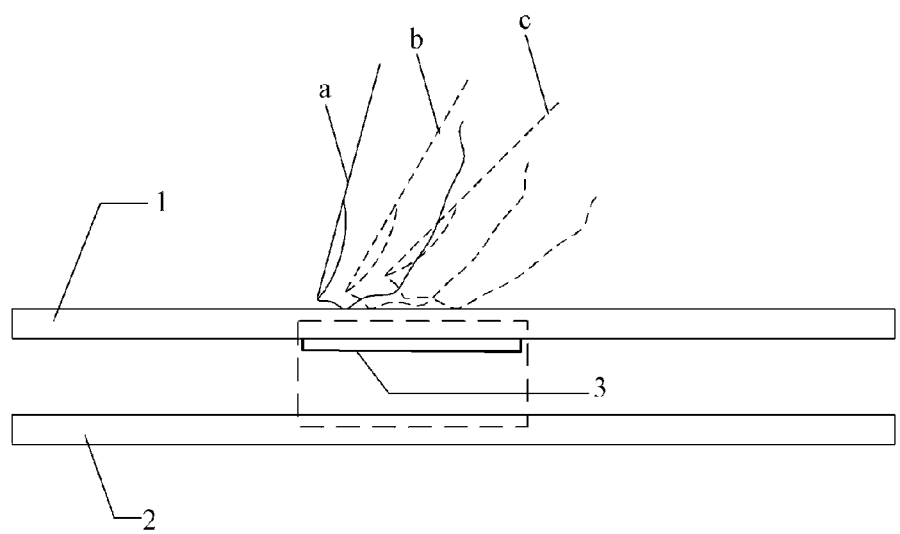

Further, the fingerprint recognition element provided by the embodiments of the present invention may also be applied in a display screen. Hence, the embodiments of the present invention further provide a display screen comprising the fingerprint recognition element, specifically, as shown in FIG. 1a to FIG. 1b, the display screen comprises an upper substrate 1 and a lower substrate 2 arranged in opposition, and further comprises at least one fingerprint recognition element provided by the embodiments of the present invention arranged on the lower substrate 2 and/or the upper substrate 1. In FIG. 1a and FIG. 1b, the fingerprint recognition element arranged on the upper substrate 1 as shown in the dashed box is taken as the example for explanation, wherein a plurality of fingerprint detecting electrodes 3 are arranged in parallel.

The display screen provided by the embodiments of the present invention may be applied in a liquid crystal display panel of a TN mode, a Fringe-Field Switching (FFS) mode, or an Advanced Super Dimension Switch (ADS) mode, and may also be integrated in an organic electroluminescent display device, and may be further integrated in other flat panel display devices, which will not be defined here. The following display screen provided by the embodiments of the present invention will be explained taking the liquid crystal display screen as the example.

The display screen provided by the embodiment of the present invention makes use of the principle of self-capacitance to load a fingerprint recognition signal to one end of each fingerprint detecting electrode 3, and acquire in real time the finger recognition signal at the other end of each fingerprint detecting electrode 3. As shown in FIG. 1a, when a user finger 9 approaches the display screen, since there are uneven ridges A and valleys B on the surface of the skin of the finger, the distances between respective points on the skin surface and the respective fingerprint detecting electrodes 3 are also different, thereby influencing the capacitance value of the respective fingerprint detecting electrodes 3. By detecting the differences of the signals acquired from respective fingerprint detecting electrodes 3 at each moment in the process of touching the display screen by the finger, a two-dimensional pattern of the fingerprint consisting of ridges and valleys that corresponds to the finger can be detected, so as to realize fingerprint recognition. It should be noted that the more concentrated the respective fingerprint detecting electrodes 3 are, the more favorable it is for fingerprint recognition.

FIG. 1a shows a fingerprint pattern consisting of ridges and valleys in finger 9, the respective fingerprint detecting electrodes 3 in the figure are arranged perpendicular to the paper direction. FIG. 1b shows three angles between the finger 9 and the display screen at three moments a, b and c in the process of the finger 9 approaching the display screen, the respective fingerprint detecting electrodes 3 in the figure are arranged parallel to the paper direction. There will be a tangent between the finger and the display screen at each of the three moments a, b and c, the tangent intersects with the respective fingerprint detecting electrodes 3 that are parallel to one another, the distribution of ridges and valleys on the tangent will influence the capacitance value of the respective fingerprint detecting electrodes 3, which results in change of fingerprint recognition signals of the respective fingerprint detecting electrodes 3 at that moment. By detecting the influence of tangents of different angles that the finger touches the display screen at different moments in the process of the finger touching the fingerprint recognition element to the respective fingerprint detecting electrodes 3, the fingerprint of the finger can be drawn.

In specific implementation, the display screen generally comprises a pheripheral area and a display area with a plurality of pixel regions arranged in an array. In the embodiments of the present invention, the fingerprint recognition element may be located in the display area consisting of the pixel regions, and may also be arranged in the peripheral area, which will be not defined here.

The distance between the valleys in the fingerprint is generally in the range of 300 μm-650 μm, i.e., the distance between adjacent ridges and valleys in the fingerprint is generally in the range of 150 μm-325 μm. The distance between respective pixel regions in the display screen is generally controlled in the range of 50 μm-90 μm, the distance between respective pixel regions is apparently less than the distance between the ridges and valleys in the fingerprint. In this way, when the fingerprint recognition element is arranged in the display area, in order not to occupy the aperture opening ratio of display, the fingerprint detecting electrodes 3 may be arranged at gaps between adjacent pixel regions, taking a 5-inch display screen with a resolution of HD720P as an example, the distance between two fingerprint detecting electrodes 3 is 86.25 μm.

Specifically, the fingerprint detecting electrodes 3 can extend along the line direction of the pixel regions, and can also extend along the column direction of the pixel regions, which will not be defined here.

Figure 2A:
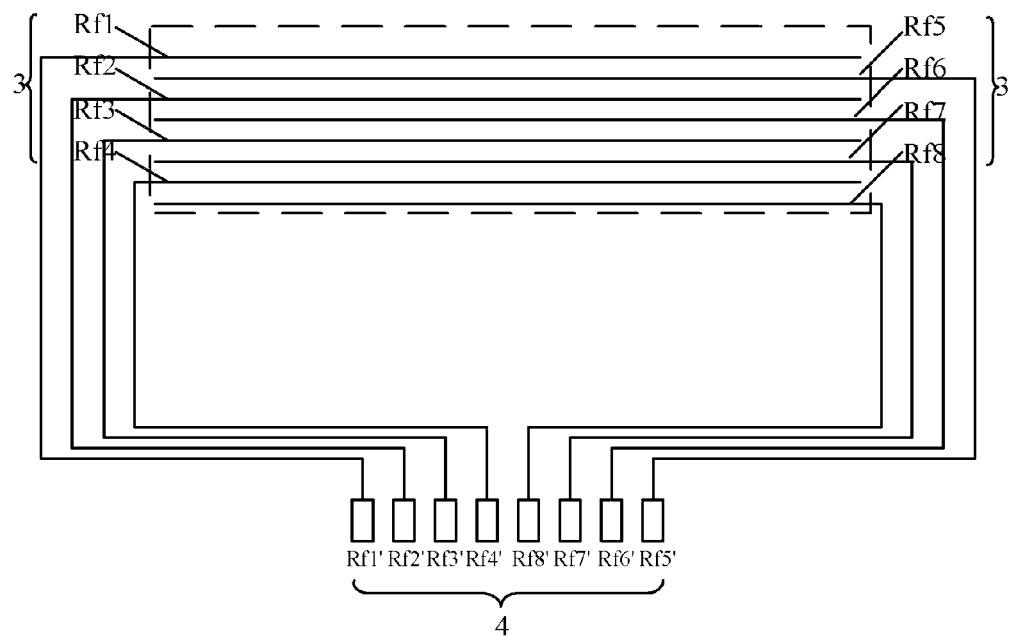
FIG. 2a to FIG. 2d are vertical schematic views of a fingerprint recognition element in a display screen provided by an embodiment of the present invention.

In specific implementation, for the convenience of detecting the differences of the signals acquired from respective fingerprint detecting electrodes 3, the display screen and the fingerprint recognition element provided by the embodiments of the present invention, as shown in FIG. 2a, further comprise: connecting terminal pads 4 in one-to-one correspondence with the fingerprint detecting electrodes 3, the fingerprint detecting electrodes 3 being in electrical connection with the coresponding connecting terminal pads 4 through leads. In FIG. 2a, the connecting terminal pad corresponding to Rf1 is Rf1', the connecting terminal pad corresponding to Rf2 is Rf2', the connecting terminal pad corresponding to Rf3 is Rf3', the connecting terminal pad corresponding to Rf4 is Rf4', the connecting terminal pad corresponding to Rf5 is Rf5', the connecting terminal pad corresponding to Rf6 is Rf6', the connecting terminal pad corresponding to Rf7 is Rf7', the connecting terminal pad corresponding to Rf8 is Rf8'.

Figure 2B:
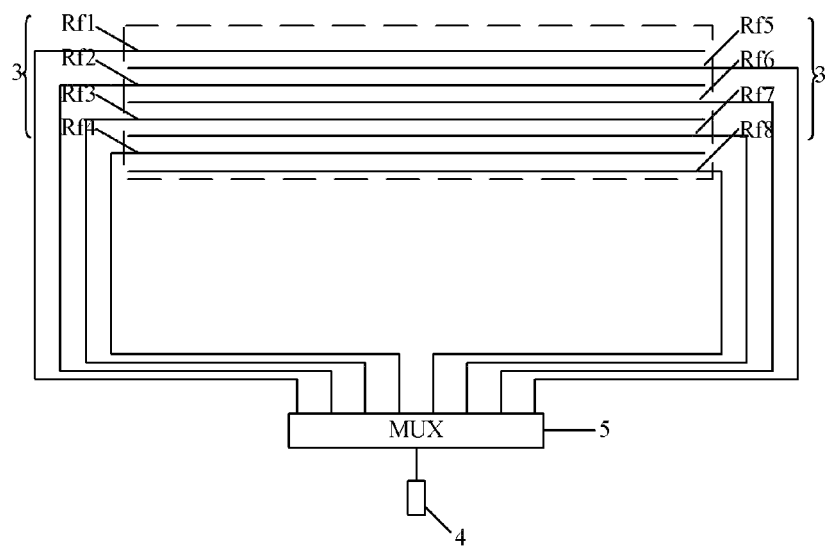

Further, due to the above connection manner of the fingerprint detecting electrodes 3 and the connecting terminal pads 4, it is required to arrange a corresponding connecting terminal pad 4 for each fingerprint detecting electrode 3, a relatively large number of connecting terminal pads 4 will be needed, which may increase manufacture cost of the display screen. Therefore, in the display screen and the fingerprint recognition element provided by the embodiments of the present invention, as shown in FIG. 2b, a data selector 5 (MUX) and a connecting terminal pad 4 may also be used, the respective fingerprint detecting electrodes 3 connecting with the data selector 5 through leads, the data selector 5 electrically connecting the respective fingerprint detecting electrodes 3 with the connecting terminal pad 4 time-divisionally. Thus the number of the connecting terminal pads 4 can be reduced by adding the data selector 5, which reduces the manufacture cost.

Optimally, in addition to being integrated with fingerprint recognition function, the display screen provided by the embodiments of the present invention can also be integrated with touch screen function. The specific structure of the display screen provided by the embodiments of the present invention integrated with touch screen function will be introduced specifically in the following.

Figure 3:
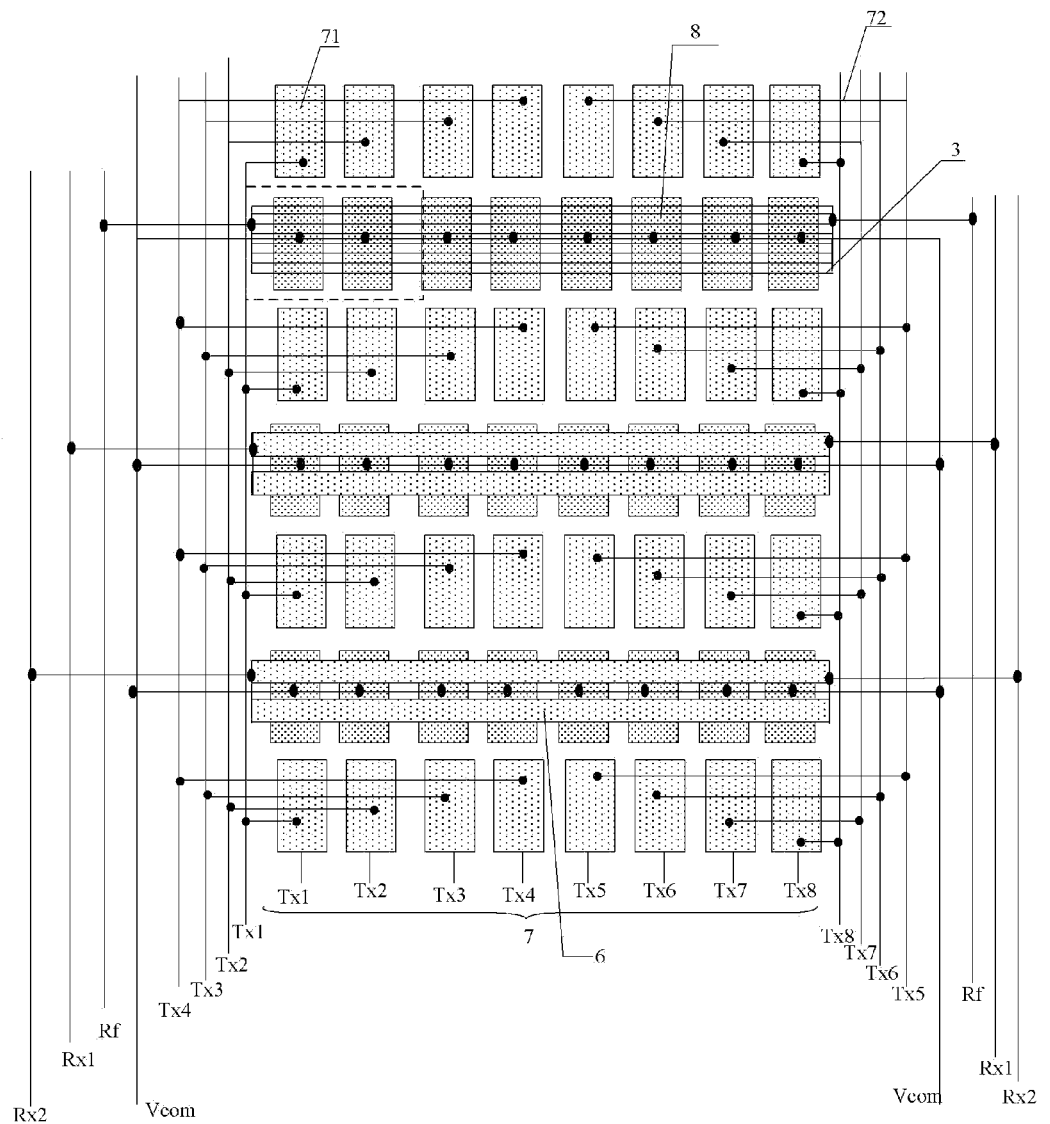
FIG. 3 is a vertical schematic view of a display screen provided by an embodiment of the present invention.

In specific implementation, the display screen provided by the embodiments of the present invention, as shown in FIG. 3, further comprises: touch sensing electrodes 6 arranged in the same layer and extending in the same direction as the fingerprint detecting electrodes 3, and touch driving electrodes 7 arranged to intersect with the touch sensing electrodes 6. What is shown in the dashed box in FIG. 3 is a fingerprint recognition element, in which seven fingerprint detecting electrodes 3 are schematically arranged, eight touch driving electrodes 7 (Tx1, Tx2, Tx3, Tx4, Tx5, Tx6, Tx7 and Tx8) and two touch sensing electrodes 6 (Rx1 and Rx2) are arranged outside the fingerprint recognition element.

In specific implementation, the touch sensing electrodes 6 and the fingerprint detecting electrodes 3 may be, as shown in FIG. 1a and FIG. 1b, arranged at a side of the upper substrate 1 facing the lower substrate 2; and may also be arranged at a side of the lower substrate 2 facing the upper substrate 1, which will not be defined here. Correspondingly, the touch driving electrodes 7 may be arrange at a side of the upper substrate 1 facing the lower substrate 2; and may also be arranged at a side of the lower substrate 2 facing the upper substrate 1, which will not be defined here. The following explanations are all made by taking the touch sensing electrodes 6 and the fingerprint detecting electrodes 3 arranged at a side of the upper substrate 1 facing the lower substrate 2, and the touch driving electrodes 7 arranged at a side of the lower substrate 2 facing the upper substrate 1 as the example.

In specific implementation, as shown in FIG. 3, since the touch sensing electrodes 6 and the fingerprint detecting electrodes 3 are arranged in the same layer, there is no overlapping between the touch sensing electrodes 6 and the fingerprint detecting electrodes 3. For the convenience of multiplexing the fingerprint detecting electrodes 3 as the touch sensing electrodes 6 in the touch time period, the touch sensing electrodes 6 are generally arranged to extend along the same direction as the fingerprint detecting electrodes 3, i.e., extending along the line direction of the pixel region in this embodiment.

Similarly, in specific implementation, since the touch driving electrodes 7 and the touch sensing electrodes 6 are arranged to intersect, the touch driving electrodes 7 extend along the column direction of the pixel region in this embodiment. Specifically, as shown in FIG. 3, when designing the touch driving electrodes 7, each touch driving electrode 7 may be arranged to consist of a plurality of touch driving sub-electrodes 71 that extend along the column direction of the pixel region, i.e., the plurality of touch driving sub-electrodes 71 extend along a direction perpendicular to the extending direction of the fingerprint detecting electrodes 3, the plurality of touch driving sub-electrodes 71 are connected with one another in series thorugh leads 72 located in the peripheral area. FIG. 3 shows eight touch driving electrodes 7 (Tx1, Tx2, Tx3, Tx4, Tx5, Tx6, Tx7 and Tx8) extending along the column direction of the pixel region, each touch driving electrode 7 consists of four touch driving sub-electrodes 71 located in the same column, the respective touch driving sub-electrodes 71 are connected in series through leads 72.

And further, in order to reduce the influence on display in the touch process, in the display screen provided by the embodiments of the present invention, as shown in FIG. 3, a common electrode 8 is arranged between two adjacent touch driving sub-electrodes 71 that constitute each touch driving electrode 7. As shown in FIG. 3, the orthographic projections of the respective touch sensing electrodes 6 on the lower substrate are located in an area where the common electrode 8 locates.

Further, as shown in FIG. 3, the orthographic projections of the fingerprint detecting electrodes 3 arranged in the same layer as the touch sensing electrodes 6 on the lower substrate are also located in an area where the common electrode 8 locates.

Figure 2C:
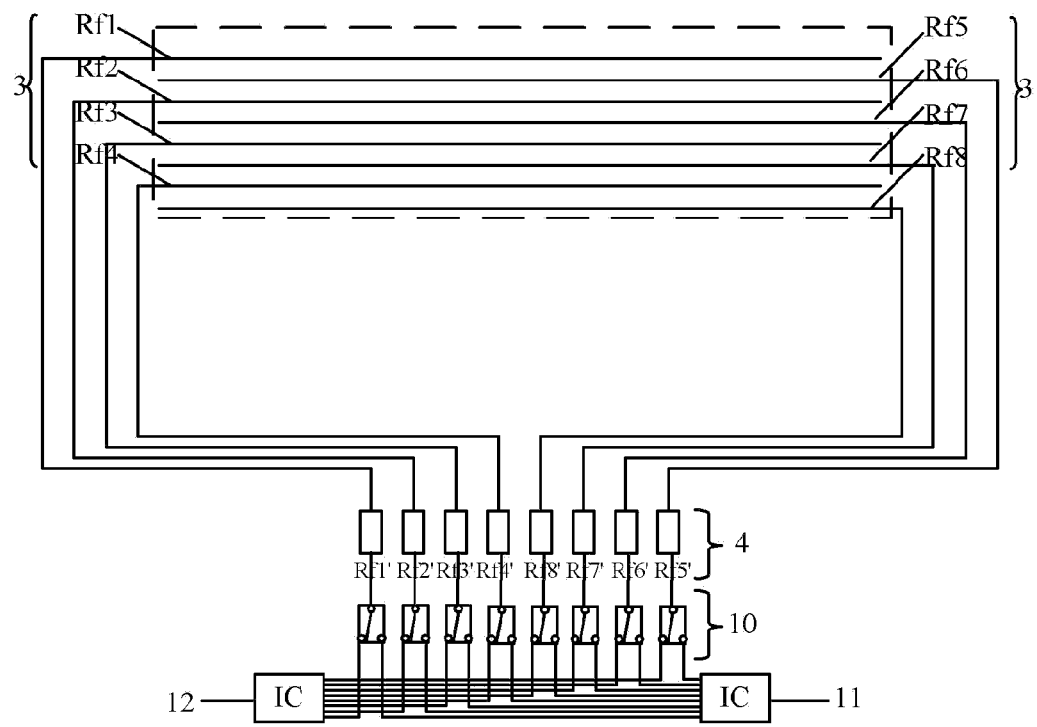

Moreover, the fingerprint detecting electrodes 3 may also be multiplexed as touch sensing electrodes in the touch time period. Specifically, as shown in FIG. 2c, switching devices 10 in one-to-one correspondence with the connecting terminal pads 4, a touch control chip 11 and a fingerprint detecting chip 12 may be comprised in the display screen.

Within a touch time period of one frame, the switching devices 10 may conduct the connecting terminal pads 4 with the touch control chip 11; here, the touch control chip 11 conducts with the fingerprint detecting electrodes 3 that connect with the connecting terminal pads 4, the fingerprint detecting electrodes 3 are used as touch sensing electrodes.

Within a fingerprint recognition time period of one frame, the switching devices 10 conduct the connecting terminal pads 4 with the fingerprint detecting chip 12; here, the fingerprint control chip 12 conducts with the fingerprint detecting electrodes 3 that connect with the connecting terminal pads 4, the fingerprint detecting electrodes 3 are used as fingerprint detecting electrodes.

Figure 2D:
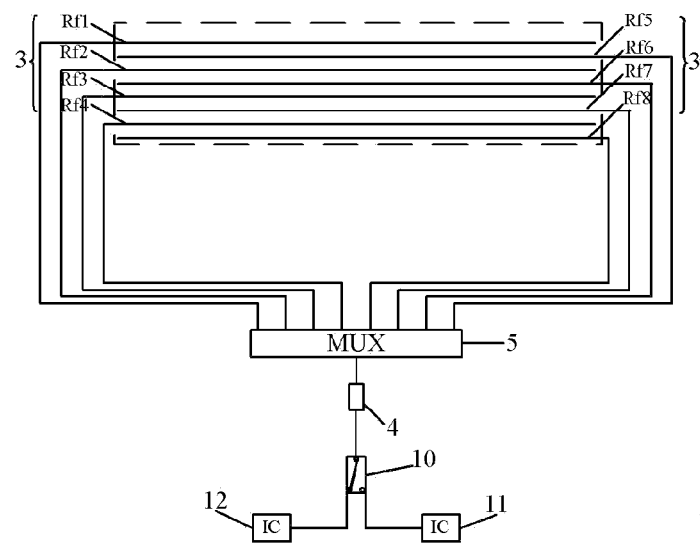

Alternatively, as shown in FIG. 2d, a switching device 10 that corresponds to the connecting terminal pad 4, a touch control chip 11 and a fingerprint detecting chip 12 may be comprised in the display screen.

Within a touch time period of one frame, the switching device 10 may conduct the connecting terminal pad 4 with the touch control chip 11; here, the touch control chip 11 conducts with the fingerprint detecting electrode 3 that connects with the connecting terminal pad 4, the fingerprint detecting electrodes 3 are used as touch sensing electrodes.

Within a fingerprint recognition time period of one frame, the switching device 10 conducts the connecting terminal pad 4 with the fingerprint detecting chip 12; here, the fingerprint control chip 12 conducts with the fingerprint detecting electrode 3 that connects with the connecting terminal pad 4, the fingerprint detecting electrodes 3 are used as fingerprint detecting electrodes.

In specific implementation, the touch driving electrodes 7 and the common electrodes 8 may constitute a common electrode layer, i.e., the common elecrode layer in the display screen can be divided into a plurality of sub-electrodes arranged in a matrix (including the touch driving electrodes 7 and the common electrodes 8).

Specifically, the common electrode layer may be located at a side of the lower substrate 2 facing the uppler substrate 1, i.e., using the ADS mode; certainly, the common electrode layer may also be lcoated on a side of the upper substrate 1 facing the lower substrate 2, i.e., using the TN mode.

Figure 4:
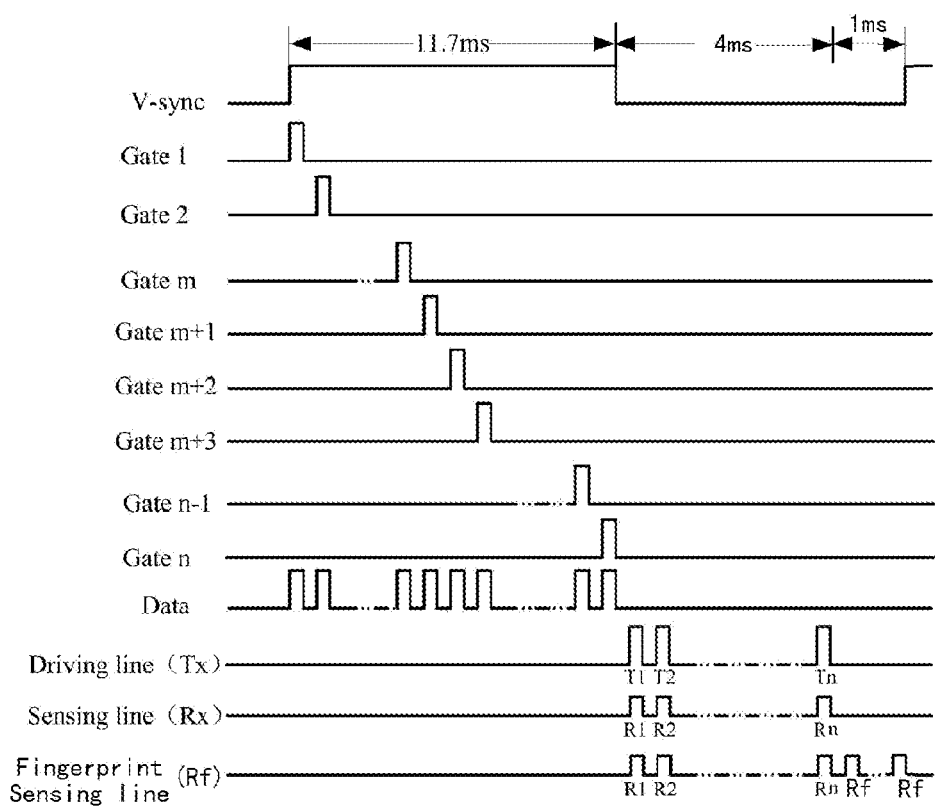
FIG. 4 is a driving timing schematic diagram of a display screen provided by an embodiment of the present invention.

In the driving timing diagram as shown in FIG. 4, the time of each frame (V-sync) is divided into display time period (Display), touch time period (Touch) and fingerprint recognition time period (Finger). For example, the time for displaying one frame in the driving timing diagram as shown in FIG. 4 is 16.7 ms, 4 ms thereof is selected as the touch time period, 1 ms as the fingerprint recognition time period, and the remaining 11.7 ms as the display time period. Certainly, the time lengths of the three may also be adjusted appropriately according to the processing capability of the IC chip, which will not be defined specifically here.

Within the display time period of one frame, the touch driving electrodes Tx and the common electrodes load a common electrode signal. Specifically, a gate scanning signal is applied to each gate signal line Gate 1, Gate 2 . . . Gate n in the display screen successively, a gray scale signal is applied to the data signal line Data, correspondingly, the touch driving electrodes here serve as the common electrodes, the touch control chip connected with them provides a constant common electrode signal to them, so as to realize the liquid crystal display funtion.

Within the touch time period of one frame, the touch control chip connected with the touch driving electrodes Tx provides touch canning signals T1, T2 . . . Tn to them respectively, meanwhile, the fingerprint detecting electrodes Rf multiplexe the touch function, the respective touch sensing electrodes Tx and fingerprint detecting electrodes Rf detect the touch sensing signals R1, R2 . . . Rn respectively, so as to realize the touch function.

Within the fingerprint recognition time period of one frame, a fingerprint recognition signal is loaded to one end of each fingerprint detecting electrode, and the fingerprint recognition signal at the other end of each fingerprint detecting electrode is acquired in real time, by calculating change of signals on the respective fingerprint detecting electrodes at different momments, a two-dimensional pattern of the fingerprint can be drawn.

Based on the same inventive concept, the embodiments of the present invention further provide a display device comprising the display screen provided by the embodiments of the present invention. The display device may be any products or components with the display function, such as mobile phone, panel computer, television, display, laptop, digital photoframe, navigator etc. The implementation of the display device may refer to the embodiments of the display screen, which will not be repeated here.

The fingerprint recognition element, the display screen and the display device provided by the embodiments of the present invention make use of the principle of self-capacitance to load a fingerprint recognition signal to one end of each fingerprint detecting electrode, and acquire in real time the finger recognition signal at the other end of each fingerprint detecting electrode. When a user finger approaches the display screen, since there are uneven ridges and valleys on the surface of the skin of the finger, the distances between respective points on the skin surface and the respective fingerprint detecting electrodes are also different, thereby influencing the capacitance value of the respective fingerprint detecting electrodes. By detecting the differences of the signals acquired from respective fingerprint detecting electrodes at each moment in the process of touching the display screen by the finger, a two-dimensional pattern of the fingerprint consisting of ridges and valleys that corresponds to the finger can be detected, so as to realize fingerprint recognition.

Apparently, the skilled person in the art can make various modifications and variations to the present invention without departing from the spirit and scope of the present invention. In this way, provided that these modifications and variations of the present invention belong to the scope of the claims of the present invention and the equivalent technology thereof, the present invention also intends to cover these modification and variations.

The invention claimed is:

1. A fingerprint recognition element, comprising a plurality of fingerprint detecting electrodes parallel to one another, a fingerprint recognition signal being loaded to one end of each of the fingerprint detecting electrodes, and the fingerprint recognition signal being acquired in real time at the other end of each of the fingerprint detecting electrodes;

wherein the distance between two adjacent fingerprint detecting electrodes is not greater than the distance between adjacent ridges and valleys in a fingerprint, and wherein a two-dimensional pattern that corresponds to the fingerprint is achieved by detecting the fingerprint recognition signals acquired from respective fingerprint detecting electrodes when a finger is touching the fingerprint recognition element.

2. The fingerprint recognition element as claimed in claim 1, further comprising terminal pads connected in one-to-one correspondence with the fingerprint detecting electrodes, the fingerprint detecting electrodes being in electrical connection with the corresponding connecting terminal pads through leads.

3. The fingerprint recognition element as claimed in claim 1, further comprising: a data selector and a connecting terminal pad, the respective fingerprint detecting electrodes connecting with the data selector through leads, the data selector electrically connecting one of the respective fingerprint detecting electrodes with the connecting terminal pad at a time.

4. A display screen comprising an upper substrate and a lower substrate arranged in opposition, further comprising at least one fingerprint recognition element as claimed as claim 1 arranged on at least one of the lower substrate and the upper substrate.

5. The display screen as claimed in claim 4, wherein the fingerprint recognition element further comprising: connecting terminal pads in one-to-one correspondence with the fingerprint detecting electrodes, the fingerprint detecting electrodes being in electrical connection with the corresponding connecting terminal pads through leads.

6. The display screen as claimed in claim 4, the fingerprint recognition element further comprising: a data selector and a connecting terminal pad, the respective fingerprint detecting electrodes connecting with the data selector through leads, the data selector electrically connecting one of the respective fingerprint detecting electrodes with the connecting terminal pad at a time.

7. A display device, comprising a display screen as claimed in claim 4.

8. The display screen as claimed in claim 4, wherein the display screen comprises a peripheral area and a display area with a plurality of pixel regions arranged in an array;

the fingerprint recognition element is located in the display area including the pixel regions;

the respective fingerprint detecting electrodes in the fingerprint recognition element are located at gaps between adjacent pixel regions.

9. A display screen comprising an upper substrate and a lower substrate arranged in opposition, further comprising at least one fingerprint recognition element arranged on at least one of the lower substrate and the upper substrate, the fingerprint recognition element comprising a plurality of fingerprint detecting electrodes parallel to one another, a fingerprint recognition signal being loaded to one end of each of the fingerprint detecting electrodes, and the fingerprint recognition signal being acquired in real time at the other end of each of the fingerprint detecting electrodes;

wherein the distance between two adjacent fingerprint detecting electrodes is not greater than the distance between adjacent ridges and valleys in a fingerprint, and wherein the display screen further comprises a peripheral area and a display area with a plurality of pixel regions arranged in an array;

the fingerprint recognition element is located in the display area including the plurality of pixel regions;

the respective fingerprint detecting electrodes in the fingerprint recognition element are located at gaps between adjacent pixel regions.

10. The display screen as claimed in claim 9, further comprising: touch sensing electrodes arranged in the same layer and extending in the same direction as the fingerprint detecting electrodes, and touch driving electrodes arranged to intersect with the touch sensing electrodes.

11. The display screen as claimed in claim 10, wherein the touch sensing electrodes and the fingerprint detecting electrodes are located at a side of the upper substrate facing the lower substrate; the touch driving electrodes are located at a side of the lower substrate facing the upper substrate.

12. The display screen as claimed in claim 10, wherein each one of the touch driving electrodes includes a plurality of touch driving sub-electrodes extending along a direction perpendicular to the extending direction of the fingerprint detecting electrodes, the plurality of touch driving sub-electrodes are connected with one another in series through leads located in the peripheral area.

13. The display screen as claimed in claim 12, wherein a common electrode is arranged between two adjacent touch driving sub-electrodes that constitute one of the touch driving electrodes;

the orthographic projections of the respective touch sensing electrodes on the lower substrate are located in an area where the common electrode is located.

14. The display screen as claimed in claim 13, wherein orthographic projections of respective fingerprint detecting electrodes on the lower substrate are located in an area where the common electrode is located.

15. The display screen as claimed in claim 14, further comprising: terminal pads connected in one-to-one correspondence with the fingerprint detecting electrodes, switching devices that correspond to the connecting terminal pads, a touch control chip and a fingerprint detecting chip;

within the touch time period of one frame, the switching devices connect the connecting terminal pads with the touch control chip;

within the fingerprint recognition time period of one frame, the switching devices connect the connecting terminal pads with the fingerprint detecting chip.

16. The display screen as claimed in claim 14, further comprising: a data selector, a connecting terminal pad, the respective fingerprint detecting electrodes connecting with the data selector through leads, the data selector electrically connecting the respective fingerprint detecting electrodes with the connecting terminal pad time-divisionally, a switching device that corresponds to the connecting terminal pad, a touch control chip and a fingerprint detecting chip;

within the touch time period of one frame, the switching devices connect the connecting terminal pads with the touch control chip;

within the fingerprint recognition time period of one frame, the switching devices connect the connecting terminal pads with the fingerprint detecting chip.

17. A display device, comprising a display screen, the display screen comprising an upper substrate and a lower substrate arranged in opposition, and at least one fingerprint recognition element arranged on at least one of the lower substrate and the upper substrate, the fingerprint recognition element comprising a plurality of fingerprint detecting electrodes parallel to one another, a fingerprint recognition signal being loaded to one end of each of the fingerprint detecting electrodes, and the fingerprint recognition signal being acquired in real time at the other end of each of the fingerprint detecting electrodes;

wherein the distance between two adjacent fingerprint detecting electrodes is not greater than the distance between adjacent ridges and valleys in a fingerprint, and wherein the display screen further comprises a peripheral area and a display area with a plurality of pixel regions arranged in an array;

the fingerprint recognition element is located in the display area including the plurality of pixel regions;

the respective fingerprint detecting electrodes in the fingerprint recognition element are located at gaps between adjacent pixel regions.

18. The display device as claimed in claim 17, further comprising: touch sensing electrodes arranged in the same layer and extending in the same direction as the fingerprint detecting electrodes, and touch driving electrodes arranged to intersect with the touch sensing electrodes.

19. The display device as claimed in claim 18, wherein the touch sensing electrodes and the fingerprint detecting electrodes are located at a side of the upper substrate facing the lower substrate; the touch driving electrodes are located at a side of the lower substrate facing the upper substrate.

20. The display device as claimed in claim 18, wherein each one of the touch driving electrodes includes a plurality of touch driving sub-electrodes extending along a direction perpendicular to the extending direction of the fingerprint detecting electrodes, the plurality of touch driving sub-electrodes are connected with one another in series through leads located in the peripheral area.

21. The display device as claimed in claim 20, wherein a common electrode is arranged between two adjacent touch driving sub-electrodes that constitute one of the touch driving electrodes;

orthographic projections of the respective touch sensing electrodes on the lower substrate are located in an area where the common electrode locates.

\* \* \* \* \*